United States Patent [19]

Ernst et al.

[11] Patent Number: 5,725,624
[45] Date of Patent: Mar. 10, 1998

[54] AIR FILTER FOR THE INTAKE AIR OF AN INTERNAL-COMBUSTION ENGINE

[75] Inventors: Volker Ernst, Sachsenheim; Arthur Klotz, Remseck, both of Germany

[73] Assignee: Filterwerk Mann & Hummel GmbH, Ludwigsburg, Germany

[21] Appl. No.: 688,824

[22] Filed: Jul. 31, 1996

Related U.S. Application Data

[63] Continuation of Ser. No. 422,594, Apr. 12, 1995, abandoned.

[30] Foreign Application Priority Data

Apr. 14, 1994 [DE] Germany .................. 44 12 474.0

[51] Int. Cl.$^6$ ............................................... B01D 46/52
[52] U.S. Cl. ............................ 55/502; 55/497; 55/511
[58] Field of Search ............................ 55/385.3, 495, 55/502, 497, 500, 503, 511, DIG. 28

[56] References Cited

U.S. PATENT DOCUMENTS

| | | | |
|---|---|---|---|
| 2,945,559 | 7/1960 | Buckman | 55/502 |
| 3,353,341 | 11/1967 | Stripp | 55/502 |
| 4,128,251 | 12/1978 | Gaither et al. | 55/502 |
| 4,440,555 | 4/1984 | Chichester | 55/502 |
| 4,725,296 | 2/1988 | Kurotobi | 55/502 |
| 5,049,274 | 9/1991 | Leason et al. | 55/502 |
| 5,120,334 | 6/1992 | Cooper | 55/502 |
| 5,213,596 | 5/1993 | Kume et al. | 55/502 |
| 5,292,432 | 3/1994 | Jainek et al. | 55/502 |

FOREIGN PATENT DOCUMENTS

| | | | |
|---|---|---|---|
| 0081330 | 6/1983 | European Pat. Off. | 55/502 |
| 4218396 | 12/1993 | Germany | 55/502 |

*Primary Examiner*—C. Scott Bushey
*Attorney, Agent, or Firm*—Evenson, McKeown, Edwards & Lenahan P.L.L.C.

[57] ABSTRACT

An air filter, particularly for the intake air of an internal-combustion engine, including a housing 13, an air filter insert 16 arranged in the housing, and a cover 10 closing off the housing 13. The air filter insert 16 is essentially a rectangular cartridge which has a surrounding seal 18. This seal 18 is clamped in between the housing 13 and the cover 10 in such a manner that it separates the unfiltered-air space from the filtered-air space. In addition, clamps 19 are provided which fasten the cover and the housing to each other and the filter cartridge is simultaneously secured in the housing. Direct supporting contact between the cover 10 and the housing 13 occurs only adjacent the clamps 19, and simultaneously the seal has a very low Shore hardness. As a result, the cover no longer rests as previously on the housing over the whole length of the seal, but only in the area of the clamps.

5 Claims, 2 Drawing Sheets

AIR FILTER FOR THE INTAKE AIR OF AN INTERNAL-COMBUSTION ENGINE

This application is a continuation of application Ser. No. 08/422,594 filed on Apr. 12, 1995 now abandoned.

BACKGROUND OF THE INVENTION

This invention relates to an air filter, particularly for the intake air of an internal-combustion engine.

Normally, such air filters consist of a housing and a cover, with an air filter insert being arranged in the housing. The air filter insert is sealingly placed in the housing, and both housing parts, which normally are formed of plastic, are clamped to one another.

It has been a disadvantage that, specifically in the case of plastic housing parts, very high tension forces had to be applied in order to press the supporting surfaces, which in the case of plastic are occasionally uneven, against one another. This also had the result that, despite the high clamping forces, the sealing was not reliable and leakage air was therefore taken in.

SUMMARY OF THE INVENTION

It is therefore an object of the invention to provide an air filter in which the above-mentioned disadvantages are avoided.

Another object of the invention is to provide an air filter in which only low tension forces are required in order to establish a reliable seal between the unfiltered-air side and the clean-air side of the air filter.

These and other objects are achieved in accordance with the present invention by providing an air filter for the intake air of an internal combustion engine, the filter comprising a housing, an air filter insert arranged in the housing, and a cover which closes off the housing; the air filter insert comprising an essentially rectangular cartridge having a surrounding seal, and the seal being clamped between the housing and the cover in such a manner that it separates an unfiltered air chamber within the filter from a filtered air chamber within the filter; the filter further comprising at least one fastener or clamp for fastening the cover and the housing to each other and simultaneously securing the filter insert in the housing.

It is an advantage of the invention that the cover on the housing is no longer supported, as previously customary, over the whole surface to be sealed off, but only in the area of the locking elements. In the remaining area, there is a minimal clearance between the cover and the housing so that a certain tolerance with respect to an unevenness may be permitted.

Because of the relatively soft seal of the filter cartridge, which is clamped between the cover and the housing, a reliable seal is established over the whole sealing area.

In a preferred embodiment, the seal of the filter cartridge is constructed such that, on the one side, it rests on the housing and, on the other side, it extends into a groove of the cover. This groove of the cover advantageously has a chamber volume which is sufficient to provide the seal with sufficient escape space in the selected tolerance range.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments depicted in the accompanying drawings in which.

DETAILED DESCRIPTION OF PREFERRED EMBODIMENTS

Figure 1:
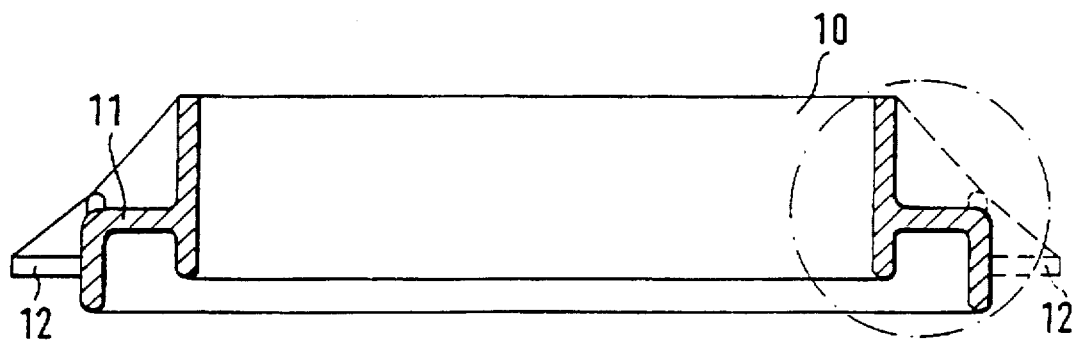
FIG. 1 is a view of a cover.

FIG. 1 shows a cover and a top part of an air filter in the area of the connection surface to a housing. This cover 10 may, for example, have a rectangular shape and has a surrounding sealing groove 11. The cover 10 is provided with supports 12 which are situated at predetermined points. These supports 12 are constructed in the form of small bearing blocks.

Figure 2:
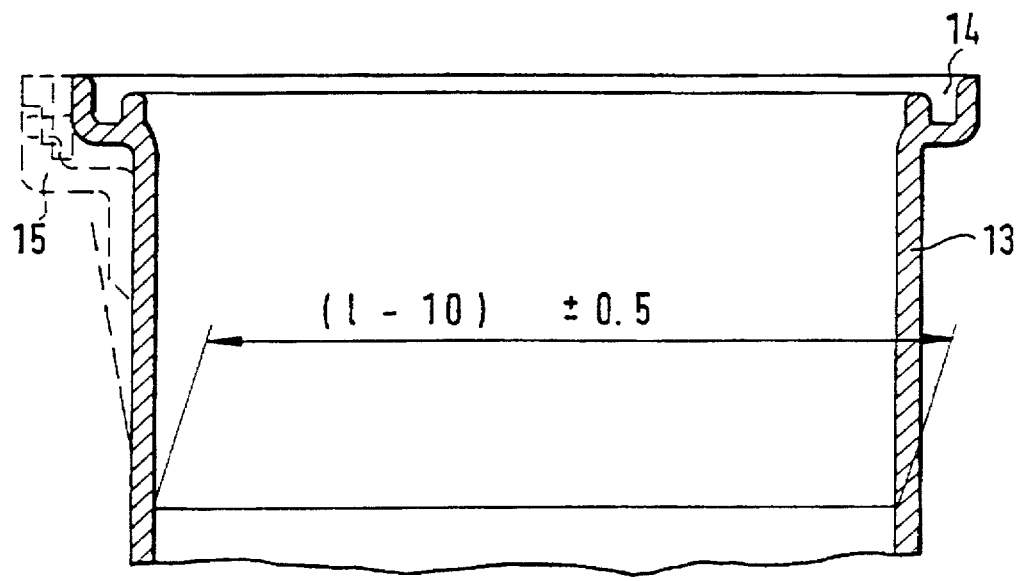
FIG. 2 is a view of a housing.

FIG. 2 shows a housing 13 for an air filter in the area of the connection surface for the cover 10. This housing 13 also has a receiving groove 14 in the area of the connection surface. In addition, fastening elements 15 are provided which are situated opposite the small blocks 12.

Figure 3:
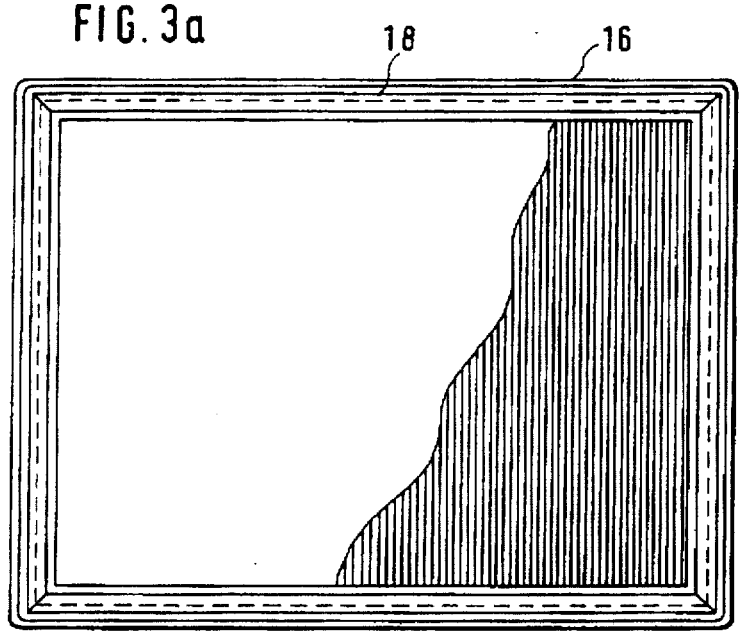
FIGS. 3a and 3b are top and side views, respectively, of a filter cartridge.
Figure 3:
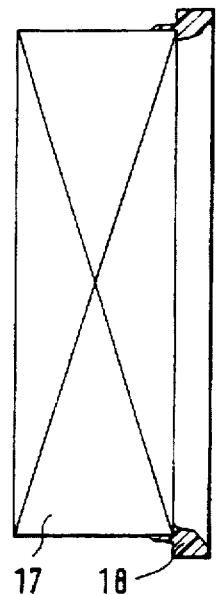

FIGS. 3a and 3b are a top view and a sectional view, respectively, of an air filter insert 16. This air filter insert 16 consists of an accordion-folded filter paper or nonwoven filter web 17 which carries a surrounding seal 18. The seal 18 is composed, for example, of a foamed and/or resilient material, such as a foamed plastic material, e.g. foamed polyurethane resin (PUR), and has a Shore A hardness of greater than 7, preferably in the range of from 7 to 60, and particularly preferably in the range from 7 to 25. If desired, the seal may be a so-called "profile seal", i.e. a seal which has an irregularly shaped cross-sectional profile with a protruding sealing finger or the like. The cartridge is inserted into the cover 10 so that the seal 18 extends into the seal groove 11.

Figure 4:
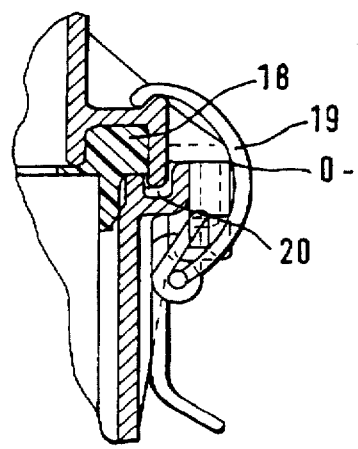
FIG. 4 is a partial sectional view in the area of the locking elements.

As shown in FIG. 4, the cover and the housing are secured to one another by means of an appropriate fastener or clamp 19. In the vicinity of this clamp 19, there is a direct contact between the cover and the housing through the small bearing block 12 and the fastening element 15. This means that actual supporting contact between the cover and the housing occurs only in the vicinity of these clamps. Since the seal 18 has a height which is slightly larger than the height of the groove 11, and at the same time the groove 11 is slightly larger in width than the width of the seal, the seal 18 provides a reliable sealing along the surrounding sealing surface between the two parts 10 and 13. At the same time, seal 18 can also slightly expand within the groove 11 in order to therefore compensate for any unevenness of the two parts resulting from manufacturing tolerances. In addition, the operating forces for the clamps 19 are reduced because it is now no longer necessary to clamp the two parts 10 and 13 tightly against one another in order to compensate for any unevenness. The normal variations due to manufacturing tolerances now no longer have a disturbing effect on the sealing function. Only in the vicinity of the clamps, do the two parts rest against one another on a zero line. Outside the area in which the clamps elements are arranged, a certain clearance 20 exists between the cover and the housing. Clearance 20 is dimensioned such that the cover 10 and the housing 13 do not contact each other even in the case of a pronounced distortion of the connection surface of one or both of these two parts.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air filter for the intake air of an internal combustion engine, said filter comprising a housing, an air filter insert arranged in the housing, and a cover which closes off the housing; said air filter insert comprising an essentially rectangular cartridge having a surrounding seal, and the entire seal having a uniform Shore A hardness in the range of from 7 to 25 and being clamped between the housing and the cover in such a manner that it separates an unfiltered air chamber within the filter from a filtered air chamber within the filter; said filter further comprising at least one clamp for clamping the cover and housing to each other and simultaneously securing the filter insert in the housing, wherein the cover directly contacts the housing only adjacent each clamp and a clearance exists between the cover and the housing except adjacent each clamp.

2. An air filter according to claim 1, wherein the seal is a profile seal.

3. An air filter according to claim 1, wherein the seal is received in a receiving groove in the cover, and the receiving groove is dimensioned such that the seal can expand in width when the cover and the housing are fastened to each other.

4. An air filter according to claim 1, wherein said cover further comprises a bearing block arranged proximate said at least one clamp, respectively, said bearing block being configured to contact the housing when the cover and the housing are fastened to each other.

5. An air filter according to claim 4, wherein said housing further comprises a fastening element arranged proximate said at least one clamp, said fastening element being configured to contact said bearing block when the cover and the housing are fastened to each other.

* * * * *